Patented June 12, 1934

1,962,276

UNITED STATES PATENT OFFICE 1,962,276

MOTH-PROTECTING MEDIA

Johann Huismann and Hugo Schweitzer, Wiesdorf-on-the-Rhine, Germany, assignors to I. G. Farbenindustrie Aktiengesellschaft, Frankfort-on-the-Main, Germany, a corporation of Germany No Drawing. Application June 14, 1929, Serial No. 371,050. In Germany June 22, 1928

20 Claims. (Cl. 167—37)

The present invention relates to agents for protecting wool, fur, hair, feathers and the like against attack by moths.

According to the present invention, materials liable to attack by moths are rendered mothproof by applying to said materials a halogen-bearing aryl sulfonic acid amide in which the hydrogen atoms of the amino group are wholly or partly replaced by alkyl-, aryl- or aralkyl groups and wherein one or more nuclei contain any substituents. These compounds may be represented by the general formula:

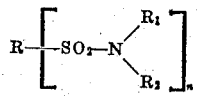

wherein R represents an aromatic nucleus, for example, a benzene or naphthalene nucleus, and $R_1$ stands either for hydrogen or alkyl aryl or aralkyl radicals, and $R_2$ stands for alkyl, aryl or aralkyl radicals, $n$ being 1 or 2. In the said formula any nuclei may contain any substituents, including aryl and aralkyl radicals, containing one or several times the sulfonic acid amido group, for example a compound of the formula:

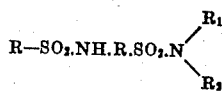

wherein R represents an aromatic nucleus and $R_1$ stands for hydrogen, or alkyl, aryl or aralkyl and $R_2$ stands for alkyl, aryl or aralkyl radicals. As shown in the following examples, the substituents of the aromatic nuclei may be chosen from alkyl, hydroxy, halogen, sulfonic acid, carboxylic acid, aryl-acidylamido and alkyl or aryl-amido-acidyl groups. For the sake of brevity, the said alkyl, aryl and aralkyl radicals will be thus defined in the claims without specifically referring to the single substituents if not expressly stated. It is to be understood, of course, that acidylamido groups cannot be connected to alkyl radicals and that the appended claims are to be read with this limitation. The quantity to be applied to the woolen articles for rendering same moth-proof varies in wide limits; among the compounds falling within the scope of the invention, there are several of which 0,1% (calculated on the amount of the article to be mothproofed) is sufficient while of others up to 5% are required; generally we apply to the article about 0,5 to about 3% of the active substance.

The protecting products, which can be obtained, for example, by the interaction of aryl sulfonic acid halides with the corresponding primary or secondary bases, are generally colorless crystalline substance having a high melting point; they are readily soluble in water in the form of their alkali salts and are partially soluble in organic solvents, such as benzenes.

These new protective agents may be applied to the materials in any of the known methods for rendering materials moth proof. Thus for example, the compounds soluble in organic solvents can be dissolved in appropriate solvents, such as benzine, benzene, alcohols, acetone, cyclohexanone and the like, but especially benzine, and sprayed onto the materials to be protected or the same can be soaked in the solution or otherwise wetted. Conversely, the water-soluble compounds (in the free state or as water-soluble salts) can be caused to act on the materials to be treated in aqueous solution, for example, in the manner of a dyeing process in a weakly acid bath at elevated temperature, say about 80° C.; in this connection the addition of organic or inorganic salts and acids or also of wetting agents may be of advantage. Obviously it is also possible to proceed by dyeing and impregnating the materials simultaneously.

A few examples of these products are:—

| | M.P. |
|---|---|
| 4-cresol-3.5-disulfo-bis-4'-chloro-anilide | 184–185° C. |
| 2-cresol-3.5-disulfo-bis-4'-chloro-anilide | 187–188° C. |
| 4-chloro-1-phenol-2-sulfo-anilide | 124° C. |
| 4-chloro-1-phenol-2-sulfo-4'-chloroanilide | 144–145° C. |
| 4.6-dichloro-1-phenol-2-sulfoanilide | 125–126° C. |
| 5-chlorosalicylic acid-3-sulfo-4'-chloroanilide | 241–242° C. |
| 5-chlorosalicylic acid-3-sulfo-2'-chloroanilide | 199–200° C. |
| 5-chlorosalicylic acid-3-sulfo-N-methyl-anilide | 219–220° C. |
| 2-chloro-1-phenol-4-sulfo-4'-chloroanilide | 158–159° C. |
| 4-chloro-1-phenol-2.6-disulfo-bis-4'-chloro-anilide | 231–233° C. |
| 4-chloro-1-phenol-2.6-disulfo-bis-4'-chloro-1'-hydroxy-2'-anilide | 255–256° C. |
| 4-chloro-1-phenol-2.6-disulfo-bis-3'-acetylamino-1'-anilide | 248–249° C. |
| 4-chloro-1-naphthol-sulfo-4'-chloroanilide | 183–185° C. |
| 5-chloro-1-phenol-2.4-disulfo-bis-4'-chloroanilide | 178–180° C. |
| Bis-4-chloro-1-phenol-2-sulfoethylene-diamide | 217° C. |
| Bis-4-chloro-1-phenol-2-sulfobenzidide | 279–280° C. |
| 2.6-dichloro-1-phenol-4-sulfo-4'-chloro-anilide | 187–188° C. |
| Bis-2.6-dichlorophenol-4-sulfo-m-phenylene-diamide | 260–261° C. |
| 4-chloro-1-phenol-2.6-disulfo-bis-benzyl-amide | 120–121° C. |
| 4-chlorobenzenesulfanilide | 108–109° C. |
| 3-chlorobenzenesulfo-4'-chloroanilide | 104–105° C. |
| 1.2-dichlorobenzene-4-sulfoanilide | 105–106° C. |
| 1.2-dichlorobenzene-4-sulfo-4'-fluoro-anilide | 113–114° C. |
| 1.2.5-trichlorobenzene-4-sulfoanilide | 162–163° C. |
| 1.2.5-trichlorobenzene-4-sulfo-3'-valerylamido-4'-chloro anilide | 125° C. |
| 1.2.5-trichlorobenzene-4-sulfo-4'-chloro-1'-anilido-3'-sulfo-anilide | 164–165° C. |
| Bis-1.4-dichlorobenzene-2-sulfoethylene-diamide | 190–191° C. |
| Bis-4-chlorobenzene-sulfo-1'.3'-phenylene-diamide | 185,5–187° C. |
| Bis-1.4-dichlorobenzene-2-sulfo-1'.3'-phenylene-diamide | 279° C. |
| Bis-1.4-dichlorobenzene-2-sulfo-2'.4'-tolylene-diamide | 216–217° C. |
| Bis-1.3-dichlorobenzene-4-sulfo-1'.3'-phenylenediamide | 270–271° C. |
| Bis-1.2-dichlorobenzene-4-sulfo-1'.3'-phenylene-diamide | 193–194° C. |
| Bis-1.2-dichlorobenzene-4-sulfo-1'.4'-phenylenediamide | 305° C. |
| Bis-1.2-dichlorobenzene-4-sulfo-1'.3'-phenylene-diamide | 222–223° C. |
| (1.2.5-trichlorobenzene-4-sulfo)-(1'.2'-dichlorobenzene-4'-sulfo)-1''.3''-phenylenediamide | 198–199° C. |

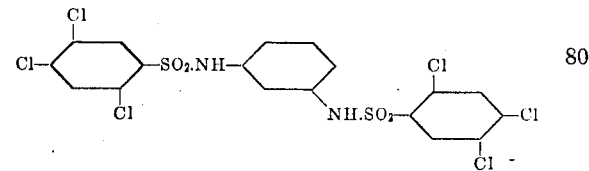

(1.2.5-trichlorobenzene-4-sulfo)-(4'-6'-dichloro-1'-phenol-2'-sulfo)-1''.3''-phenylenediamide............ M.P. 183,5-185° C.

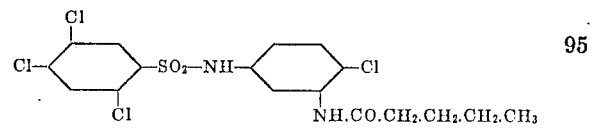

(1.2.5-trichlorobenzene-4-sulfo)-(4'-chloro-3'-aminobenzene-1'-sulfo)-1''.3''-phenylenediamide............ M.P. 185-186° C.

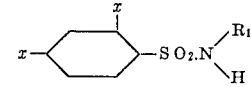

Bis-1.2-dichlorobenzene-4-sulfo-4'-chloro-1'.3'-phenylenediamide............ 189-190° C.
Bis-1.2-dichlorobenzene-4-sulfo-1'-acetylamino-2'.4'-phenylenediamide............ 197° C.
Bis-4-chlorobenzene-sulfo-1'.4'-phenylenediamide-2'-sulfo-4''-chloro-1'''-anilide............ 256-257° C.

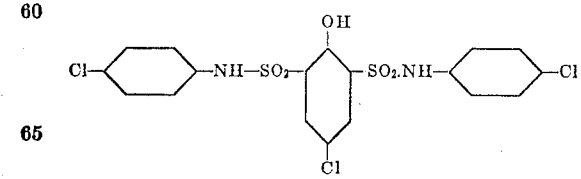

M. P.
Bis-1.2-dichlorobenzene-4-sulfo-2'.7'-naphthylenediamide............ 186-187° C.
Bis-1.4-dichlorobenzene-2-sulfobenzidide............ 228-229° C.
Tris-4-chlorobenzene-sulfo-m-amido-benzidido............ 257-258° C.
Bis-1.2-dichlorobenzene-4-sulfo-2'.4'-tolylenediamide-6-sulfonic acid.
Bis-4-bromo-benzene-sulfo-1'.3'-phenylenediamide...... 212-213° C.
Bis-1.2-dichlorobenzene-4-sulfo-benzidide-m.m'-disulfonic acid.
1.2-dichlorobenzene-4.6-disulfo-bis-4'-chloroanilide...... 192-193° C.
1.3-dichlorobenzene-4.6-disulfo-bis-4'-chloroanilide...... 235-236° C.
1.4-dichlorobenzene-2.6-disulfo-bis-4'-chloroanilide...... 264-265° C.
Naphthalene-2.6-disulfo-anilide............ 237° C.

The following examples illustrate our invention, without limiting it thereto:

*Example 1.*—100 kgs of the materials to be protected are treated in ten times the weight of hot water with 3% of the sodium salt of 4-chloro-1-phenol-2.6-disulfo-bis-4'-chloroanilide having in its free state the following formula:

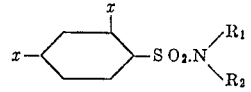

with the addition of 2-5% of acetic acid or sulfuric acid and then rinsed in the customary manner. This treatment renders the materials moth proof.

*Example 2.*—100 kgs of the materials to be protected are treated in ten times the weight of hot water with 3% of the sodium salt of the bis-1.2.5-trichloro-benzene-4-sulfo-1'.3'-phenylenediamide (M. P. 242-243° C.) having in its free state the following formula:

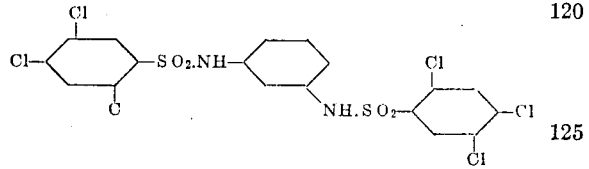

with the addition of 2-5% of acetic acid or sulfuric acid and then rinsed in the customary manner. This treatment confers upon the wool excellent protection against moth.

*Example 3.*—100 kgs of the materials to be moth proofed are steeped in 3% benzine solution of 1.2.5-trichlorobenzene-4-sulfo-3'-valeryl-amido-4'-chloroanilide of the formula:

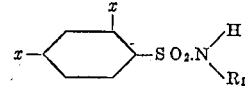

and centrifuged. After drying the material is moth proof.

We claim:

1. As a moth proofing agent an aryl sulfonic acid amide of the general formula:

$$x-\underset{x}{\bigcirc}-SO_2N\underset{H}{\overset{R_1}{\diagdown}}$$

wherein the one $x$ stands for a chlorine atom and the other $x$ stands for hydrogen which may be substituted by a chlorine atom and $R_1$ stands for a benzene nucleus which is substituted by a sulfonic acid aryl amide residue and wherein all nuclei may further contain a substituent selected from the group consisting of hydroxy, halogen, alkyl, aryl, alkylacidylamido, arylacidylamido, sulfonic acid and carboxylic acid groups.

2. As a moth proofing agent the aryl sulfonic acid amide of the following formula:

[structure: Cl, Cl substituted benzene—SO₂.NH—benzene—NH.SO₂—benzene with Cl, Cl, Cl]

3. As a moth proofing agent, an aryl sulfonic acid amide of the general formula:

$$x-\underset{x}{\bigcirc}-SO_2N\underset{R_2}{\overset{R_1}{\diagdown}}$$

wherein the one $x$ stands for a halogen atom and the other $x$ stands for hydrogen or a halogen atom, and $R_1$ stands for a hydrogen or an alkyl radical, and $R_2$ stands for a substituent selected from the group consisting of alkyl, aryl and aralkyl radicals.

4. As a moth proofing agent, an aryl sulfonic acid amide of the general formula:

$$x-\underset{x}{\bigcirc}-SO_2N\underset{R_1}{\overset{H}{\diagdown}}$$

wherein the one $x$ stands for a halogen atom and the other $x$ stands for hydrogen or a halogen atom, and $R_1$ stands for a substituent selected from the group consisting of alkyl, aryl and aralkyl, and wherein all nuclei may be further substituted by a substituent selected from the group consisting of hydroxy-, halogen-, alkyl-, aryl-, alkylacidylamido-, arylacidylamido-, sulfonic acid- and carboxylic acid groups.

5. As a moth-proofing agent, a halogen-bearing aryl-sulfonic acid amide corresponding to the general formula:

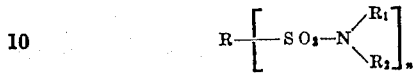

in which $n$ denotes 1 or 2, R denotes an aromatic nucleus, $R_1$ denotes a hydrogen atom or an alkyl radical and $R_2$ denotes an alkyl, aryl or aralkyl radical.

6. As a moth-proofing agent, a halogen-bearing aryl-sulfonic acid amide corresponding to the general formula:

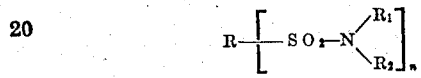

in which $n$ denotes 1 or 2, R denotes a benzene nucleus, $R_1$ denotes a hydrogen atom or an alkyl radical and $R_2$ denotes an alkyl, aryl or aralkyl radical.

7. As a moth-proofing agent, a halogen-bearing aryl-sulfonic acid amide corresponding to the general formula:

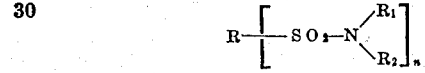

in which $n$ denotes 1 or 2, R denotes a benzene nucleus, $R_1$ denotes a hydrogen atom or an alkyl radical and $R_2$ denotes an alkyl, aryl or aralkyl radical, in which amide at least one chlorine atom is connected to an aromatic nucleus.

8. As a moth-proofing agent, an aryl-sulfonic acid amide corresponding to the general formula:

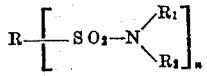

in which $n$ denotes 1 or 2, R denotes a benzene nucleus, $R_1$ denotes a hydrogen atom or an alkyl radical and $R_2$ denotes an aromatic radical which contains at least one chlorine atom connected to an aromatic nucleus and a group selected from the class consisting of amidoacidyl and acidylamido groups, at least one chlorine atom being in para-position to one of said amidoacidyl or acidylamido groups.

9. As a moth protecting agent, an aryl sulfonic acid amide of the general formula:

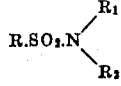

wherein R stands for an aromatic nucleus and $R_1$ stands for hydrogen or a substituent selected from the group consisting of alkyl, aryl and aralkyl, and $R_2$ means a substituent selected from the group consisting of alkyl, aryl and aralkyl, and wherein all nuclei may further be substituted by a substituent selected from the group consisting of hydroxy-, halogen-, alkyl-, aryl-, alkylacidylamido-, arylacidylamido- sulfonic acid- and carboxylic acid groups.

10. As a moth proofing agent, an aryl sulfonic acid amide of the general formula:

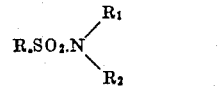

wherein R stands for a benzene nucleus and $R_1$ stands for hydrogen or a substituent selected from the group consisting of alkyl, aryl and aralkyl, and $R_2$ means a substituent selected from the group consisting of alkyl, aryl and aralkyl, and wherein all nuclei may further be substituted by a substituent selected from the group consisting of hydroxy-, halogen-, alkyl-, aryl-, alkylacidylamido-, arylacidylamido- sulfonic acid- and carboxylic acid groups.

11. A material liable to attack by moths, having incorporated therein a sulfonic-acid aryl amide as defined in claim 1.

12. A material liable to attack by moths, having incorporated therein a sulfonic-acid aryl amide as defined in claim 2.

13. A material liable to attack by moths, having incorporated therein a sulfonic-acid aryl amide as defined in claim 3.

14. A material liable to attack by moths, having incorporated therein a sulfonic-acid aryl amide as defined in claim 4.

15. A material liable to attack by moths, having incorporated therein a sulfonic-acid aryl amide as defined in claim 5.

16. A material liable to attack by moths, having incorporated therein a sulfonic-acid aryl amide as defined in claim 6.

17. A material liable to attack by moths, having incorporated therein a sulfonic-acid aryl amide as defined in claim 7.

18. A material liable to attack by moths, having incorporated therein a sulfonic-acid aryl amide as defined in claim 8.

19. A material liable to attack by moths, having incorporated therein a sulfonic-acid aryl amide as defined in claim 9.

20. A material liable to attack by moths, having incorporated therein a sulfonic-acid aryl amide as defined in claim 10.

JOHANN HUISMANN. [L. S.]
HUGO SCHWEITZER. [L. S.]